United States Patent [19]
Hentschel et al.

[11] Patent Number: 5,696,707
[45] Date of Patent: Dec. 9, 1997

[54] METHOD OF MEASURING THE NOISE LEVEL IN THE PRESENCE OF A SIGNAL

[75] Inventors: Christian Hentschel, Gaeufelden; Emmerich Mueller, Aidlingen; Clemens Rueck, Bondorf; Edgar Leckel, Jettingen, all of Germany

[73] Assignee: Hewlett-Packard Company, Palo Alto, Calif.

[21] Appl. No.: 419,999

[22] Filed: Apr. 10, 1995

[30] Foreign Application Priority Data

Apr. 11, 1994 [EP] European Pat. Off. ............ 94105533

[51] Int. Cl.$^6$ ............................................................. H01S 3/00
[52] U.S. Cl. ........................ 364/574; 359/110; 359/337; 359/177; 359/341
[58] Field of Search ...................... 364/574; 359/337, 359/177, 333, 341, 110; 385/24, 27, 31

[56] References Cited

U.S. PATENT DOCUMENTS

| | | | |
|---|---|---|---|
| 5,095,281 | 3/1992 | Tzeng | 330/2 |
| 5,138,483 | 8/1992 | Grasso et al. | 359/341 |
| 5,340,979 | 8/1994 | Baney et al. | 250/214 B |
| 5,343,286 | 8/1994 | Keeble et al. | 356/73.1 |
| 5,363,234 | 11/1994 | Newhouse et al. | 359/341 |
| 5,392,153 | 2/1995 | Delavaux | 359/341 |
| 5,430,572 | 7/1995 | DiGiovanni et al. | 359/341 |
| 5,436,759 | 7/1995 | Dijaili et al. | 359/333 |
| 5,471,334 | 11/1995 | Masuda et al. | 359/177 |
| 5,506,723 | 4/1996 | Junginger | 359/341 |
| 5,521,751 | 5/1996 | Aida et al. | 359/337 |
| 5,561,551 | 10/1996 | Iwasaki et al. | 359/337 |
| 5,574,534 | 11/1996 | Nogiwa et al. | 359/337 |

FOREIGN PATENT DOCUMENTS

A0588662  3/1994  European Pat. Off. .

OTHER PUBLICATIONS

IEEE Photonics Technology Letters, vol. 5, No. 12, Dec. 1993 New York US, pp. 1436–1438 H. Masuda et al 'Noise Figure Monitoring of a Cascaded In–Line Erbium–Doped Fiber Amplifier' p. 1438, left column,last paragragh–right column, parag. 1; figs. 1–4.
Patent Abstracts of Japan vol. 17, No. 509 (P–1612) 13 Sep. 1993 & JP–A–05 133 841 (Suitomo Electric Ind) *abstract.
Patent Abstracts of Japan vol. 17, No. 254 (P–1538) 19 May 1993 & JP–A–04 370 732 (Ando Electric Co) *abstract.
Optical Fiber Amplifiers – Measurement of Gain and Noise Figure 1993 Lightwave Symposium – Hewlett–Packard Company 1993 Automatic Test System for Erbium Doped Fiber Amplifiers Hewlett Packard Company Brochure.

Primary Examiner—Emanuel T. Voeltz
Assistant Examiner—Hien Vo

[57] ABSTRACT

A method and apparatus for measuring the noise level in an optical amplifier in the presence of a signal at a signal wavelength. The signal is detuned to a second wavelength different from the signal wavelength. A difference function corresponding to the difference in noise levels before and after detuning of the signal as a function of wavelength is determined. The noise level at the signal wavelength is measured. The value of the difference function at the signal wavelength is added to the noise level measured in the previous step.

12 Claims, 3 Drawing Sheets

METHOD OF MEASURING THE NOISE LEVEL IN THE PRESENCE OF A SIGNAL

The invention relates to a method and apparatus for measuring the noise level in the presence of a signal. Such a method and apparatus is used, for example, in noise figure measurements of optical amplifiers.

BACKGROUND OF THE INVENTION

Optical amplifiers are used in optical telecommunications systems to provide compensation of losses incurred within the optical transmission network. A particularly advantageous type of optical amplifier is the erbium-doped fiber amplifier (EDFA). Important parameters for characterizing an erbium-doped fiber amplifier and other optical amplifiers are gain and noise figure. The noise figure is important in comparing the performance of various amplifier designs and for system design. Noise generated in an erbium-doped fiber amplifier will degrade the signal-to-noise ratio at the optoelectronic receiver and thus increase the bit error rate of an optical communications system. One source of noise is incoherent radiation which is generated in the erbium-doped fiber amplifier, called amplified spontaneous emission.

While the measurement of the gain is comparatively straightforward, the measurement of noise figure of optical amplifiers encounters practical difficulties. For example, the noise level must be determined at the wavelength (or frequency) of an optical signal, in the presence of the signal. Both signal and noise are usually displayed on an optical spectrum analyzer as a plot of optical intensity versus wavelength. At the wavelength of the signal, the noise and the signal intensities are superimposed so that it is difficult to determine what the actual noise intensity at this wavelength is.

A known method of solving the mentioned problem is to use interpolation. According to this method, the noise levels to the left and to the right of the signal (at a smaller and at a greater wavelength) are measured and the noise level at the signal wavelength is determined by interpolation. An improvement of this method is also known, i.e., taking several samples at various distances from the signal wavelength on each side of the signal wavelength and interpolating to the signal wavelength by spline approximation or polynomial fitting.

The optical spectrum analyzer used in the characterization of an erbium-doped fiber amplifier is expected to display, in addition to the signal, amplified spontaneous emission (ASE) only. In reality, the spontaneous emission of the source (SSE) is also amplified by the erbium-doped fiber amplifier and adds to the amplified spontaneous emission. One way of eliminating the spontaneous emission of the source is measuring it before the fiber amplifier is inserted, and subtracting (gain times spontaneous emission of the source) from the displayed spontaneous emission. This method is called "amplified spontaneous emission interpolation/subtraction".

Another alternative is the polarization extinction method. This method is based on the fact that the amplified spontaneous emission is completely unpolarized whereas the spontaneous emission of the source is either completely polarized or can be polarized using a polarizer. Then a polarization controller/filter is used to extinguish the polarized spontaneous emission of the source so that only the unpolarized amplified spontaneous emission passes (more precisely, one half of it). A problem with this method is that the polarization mode dispersion of the erbium-doped fiber amplifier reduces the amount of suppression of spontaneous emission of the source at wavelengths away from the signal wavelength. The larger the wavelength difference and/or the polarization mode dispersion, the less perfect the suppression. This leads to the—sometimes strong—wavelength dependence of the combined (ASE+ Gain times SSE)-signal (a dip at the signal wavelength) on the optical spectrum analyzer when using the polarization extinction method.

The known methods of measuring the noise level suffer from limited accuracy, particularly because sometimes the noise level exhibits a strong curvature near the signal wavelength. In the polarization extinction technique, the noise level may have a strong curvature near the signal wavelength as this is an inherent property of this technique. It is apparent that such a curvature makes it difficult to determine the actual noise intensity at the signal wavelength. The polarization extinction technique and some other methods for determining noise figure in optical amplifiers are described in D. Baney, C. Hentschel, J. Dupre: "Optical Fiber Amplifiers", Lightwave Symposium 1993.

SUMMARY OF THE INVENTION

It is thus an object of the invention to provide a method and apparatus for measuring the noise level in the presence of a signal which has a higher accuracy.

According to an underlying principle of the invention, the signal wavelength is detuned, using, for example, a tunable laser source, thereby giving access to the true waveshape of the noise at the signal wavelength. The absolute noise level is likely to change as a consequence of detuning. However, this effect can be corrected by curve fitting between the original noise curve and the detuned noise curve.

In an embodiment of the invention, the noise levels are measured with an optical spectrum analyzer at a plurality of wavelengths before and after detuning and a difference function is derived therefrom describing the difference in noise levels before and after detuning. From the measurement of the noise level at the original signal wavelength and the interpolated value of the difference function at this wavelength, the true noise level is determined.

Another advantage of the invention consists in the following: For amplifiers with large polarization mode dispersion, the classical polarization extinction method is not perfectly suited to determine the lowest point of the above mentioned dip displayed on the optical spectrum analyzer. With the method according to the invention, the dip is displayed well (the bottom of the dip represents the point where the spontaneous emission of the source is most strongly suppressed).

BRIEF DESCRIPTION OF THE DRAWINGS

Subsequently, the invention is explained in more detail with reference to the drawings.

DETAILED DESCRIPTION OF THE INVENTION

Figure 1:
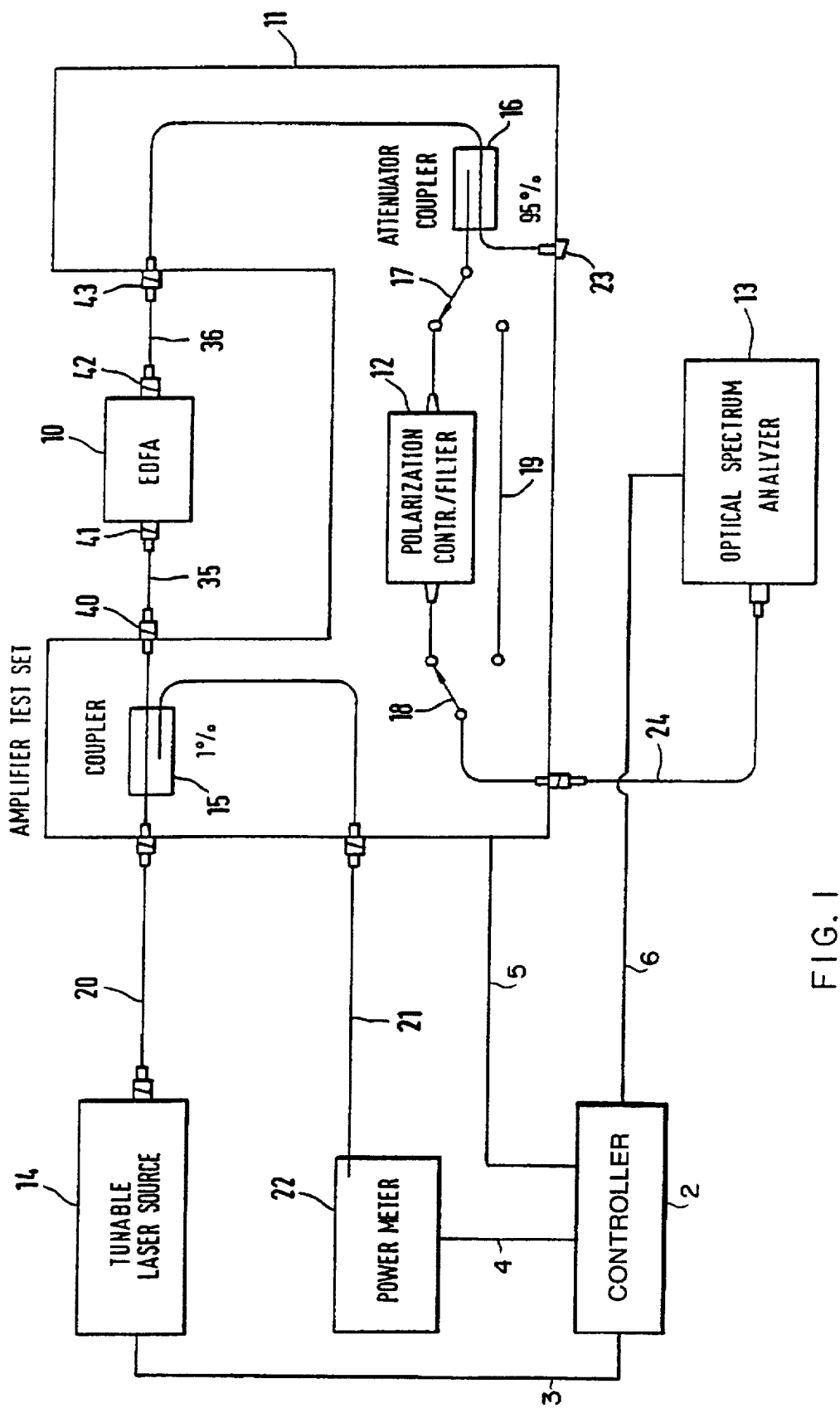
FIG. 1 shows an embodiment of an apparatus for performing the invention.

FIG. 1 shows an apparatus for measuring the noise level in an erbium-doped fiber amplifier 10.

Controller 2 is a computer hardware/software subsystem, which under user operation, controls the noise level measurement system. Controller 2 includes standard computer system I/O keyboard and monitor, CPU, memory, and operating system software (not shown). Controller 2 also includes interface units (not shown) for coupling controller 2 to tunable laser source 14 over signal lines 3, to power meter 22 over signal lines 4, to amplifier test set 11 over signal lines 5, and to optical spectrum analyzer 13 over signal lines 6. An example of controller 2 is Hewlett-Packard Model No. HP 745i controller. An example of such interface units and signal lines 3, 4, 5 and 6 collectively is the HP-IB interface bus, a well known system interconnect for connecting electronic instruments to a computer hardware/ software subsystem. Menu driven test system application software integrated into controller 2 allows the user to operate controller 2 using the I/O monitor and keyboard. The operation of controller 2 is described in more detail hereinafter.

The amplifier 10 is connected via optical fibers 35 and 36 to an amplifier test set 11. The connection of the fibers 35 and 36 with the amplifier 10 on the one hand and the test set 11 on the other hand is accomplished by means of optical connectors 40, 41, 42, 43. The amplifier test set 11 is connected with an optical fiber 20 to the output of a tunable laser source 14. The tunable laser source 14 provides a coherent light beam the wavelength of which can be adjusted to desired value. An example of such a tunable laser source is the Hewlett-Packard Model No. HP 8168A Tunable Laser Source.

The amplifier test set 11 comprises a first optical coupler 15 which directs a certain fraction of the laser light entering the test set 11 to a power meter 22. The branched off laser light is transmitted to the power meter 22 via an optical fiber 21. The test set 11 further comprises a second optical coupler 16 which directs a certain fraction of the laser light which has been transmitted through the first coupler 15 and then through the erbium-doped fiber amplifier 10 to an output terminal 23. For measuring the gain of the erbium-doped fiber amplifier 10, the output terminal 23 is connected to a power meter. The power meter 22, for example, can be used for this purpose. An example of such a power meter is the Hewlett-Packard Model No. HP8153A Power Meter. By comparing the optical intensities branched off from the first coupler 15 and from the second coupler 16, respectively, the amplifier gain is determined. According to a practical example, about 1% of the optical intensity incident on the first coupler 15 and about 95% of the optical intensity incident on the second coupler 16 are branched off.

The amplifier test set 11 further comprises a polarization controller/filter 12 which partly suppresses the signal and the spontaneous emission from the tunable laser source. As outlined above, the polarization controller/filter is supposed to suppress the spontaneous emission of the source. It will also suppress the signal, because the spontaneous emission of the source has the same state of polarization as the signal. However, the suppression of the signal is not strong enough to be able to measure directly at the signal wavelength. The optical output signal from the polarization controller/filter 12 is transmitted via an optical fiber 24 to an optical spectrum analyzer 13. The optical spectrum analyzer provides a display of light intensity versus wavelength (or frequency). In a practical example, the optical spectrum analyzer is a Hewlett-Packard Model No. HP 71450A Optical Spectrum Analyzer.

Instead of passing through the polarization controller/ filter 12, the optical signal from the amplifier 10 can directly be transmitted to the optical spectrum analyzer 13. For this purpose, a switching means 17,18 is provided which allows a bypass of the polarization controller/filter 12 via an optical transmission line 19.

Figure 2:
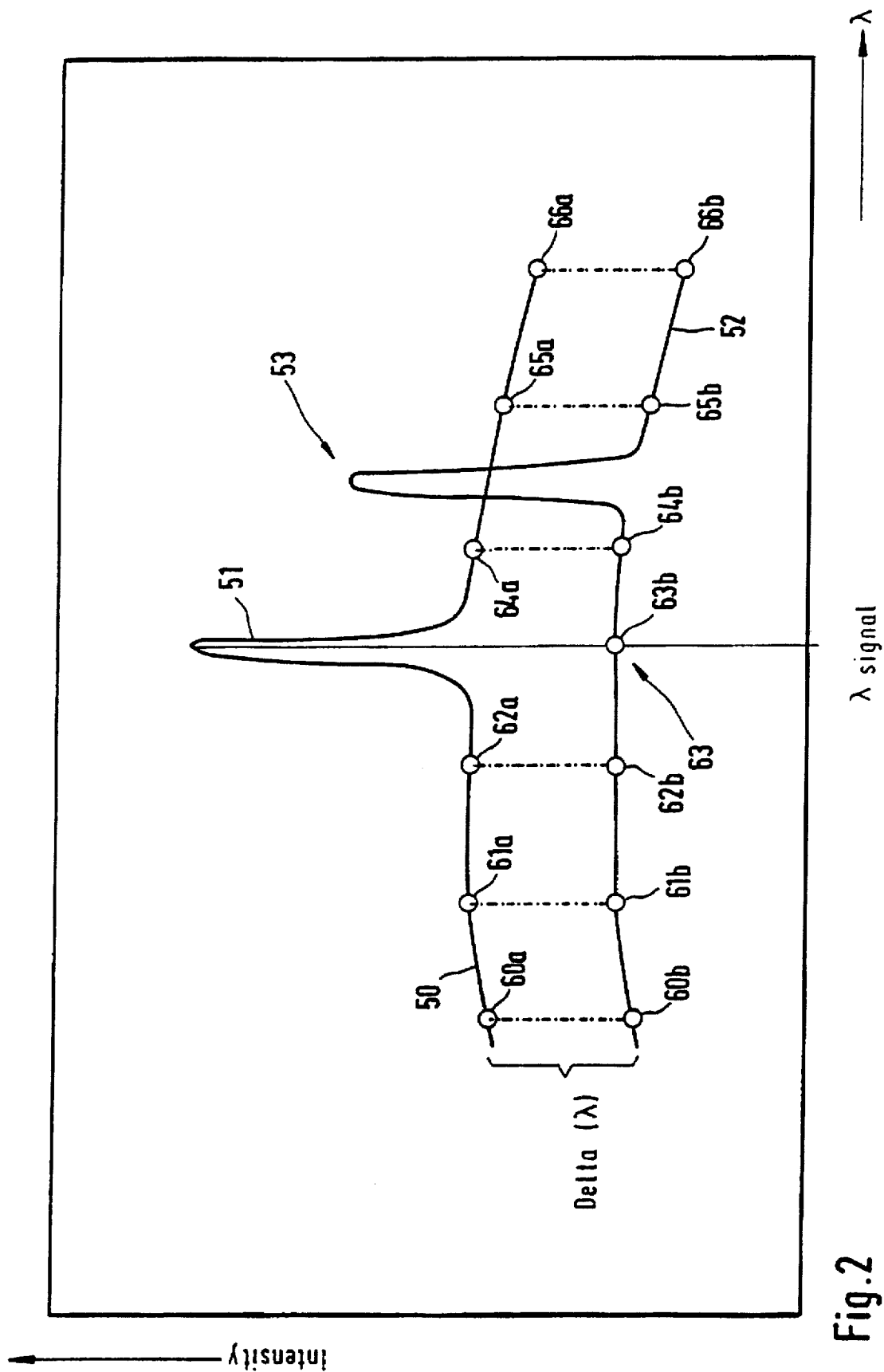
FIG. 2 shows two optical signal curves for illustrating the principle of the invention.

In the following, the individual method steps for measuring the noise level will be described with reference to FIG. 2. FIG. 2 is a display of curves on the optical spectrum analyzer 13. The horizontal axis is the wavelength of the optical signal, and the vertical axis is the intensity. The upper curve 50 comprises a signal peak 51 at the wavelength $\lambda_{signal}$. The noise level at the wavelength $\lambda_{signal}$ is to be determined.

According to a first step of the invention, several noise samples of the curve 50 at predefined wavelengths are measured. These noise samples are labelled with reference numerals 60a, 61a, 62a, 64a, 65a, 66a. In the second step, the entire curve 50 with the signal peak 51 is detuned by a certain wavelength. The detuning is accomplished by changing the wavelength of the output signal of the tunable laser source 14 correspondingly. In a practical example, the signal is detuned by about 1-2 nanometers. The resulting curve on the optical spectrum analyzer 13 is the curve 52 with the signal peak 53. This curve is shifted relative to the original curve 50 with the signal peak 51 by a certain wavelength interval. In the next step, the noise samples on the detuned curve 52 are measured at the same wavelengths as the noise samples of the original curve 50. The noise samples of the detuned curve are labelled with 60b, 61b, 62b, 64b, 65b, 66b. Furthermore, the noise sample 63 at the wavelength $\lambda_{signal}$ of the original signal peak 51 is measured. The numerical value of the noise sample 63 will be denoted as $N^*(\lambda_{signal})$.

In the next step, the difference function Delta ($\lambda$) is determined. This difference function corresponds to the numerical difference between the noise samples taken at the original curve 50 and those taken at the detuned curve 52 at the same wavelengths, respectively, as a function of the wavelength. Then, the value of the function Delta ($\lambda$) is determined at the wavelength $\lambda_{signal}$ of the original signal peak 51. This is done either by interpolation or by spline approximation or, according to a preferred embodiment, by polynomial fitting.

Finally, the correct noise level $N(\lambda_{signal})$ at the wavelength $\lambda_{signal}$ is determined by adding the value of the difference function at the wavelength a signal to the value of the noise sample 63:

$$N(\lambda_{signal}) = \text{Delta}(\lambda_{signal}) + N^*(\lambda_{signal}).$$

The above described process can be automated, i.e., the measurement of the noise samples at the original and at the detuned curve as well as the necessary calculations are performed automatically under the control of a computer hardware/software subsystem, such as controller 2 shown in FIG. 1.

Figure 3:
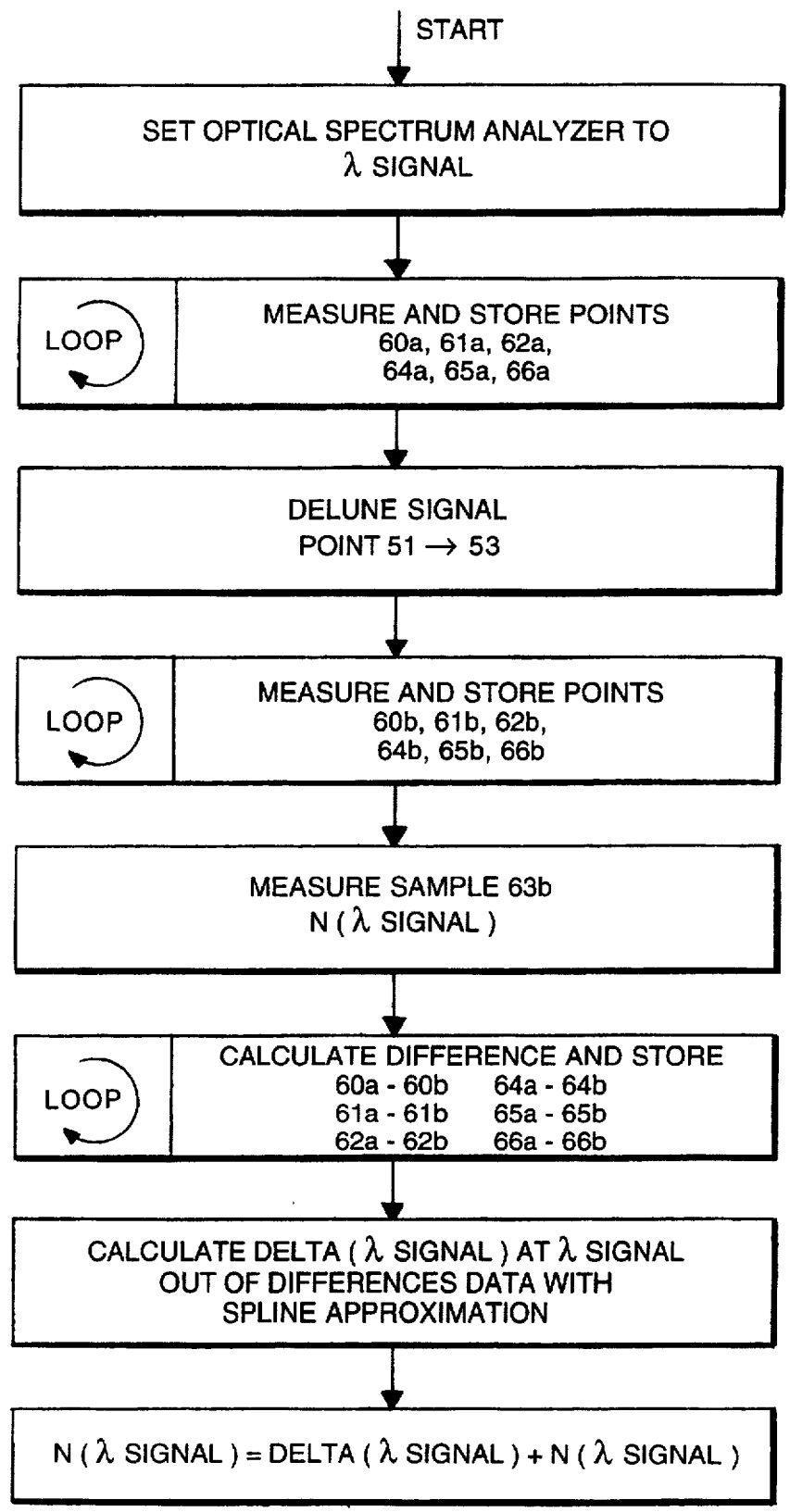
FIG. 3 shows in block diagram form the steps undertaken in conducting a computer controlled automated noise level measurement.

Referring to FIG. 3, a start-to-end block diagram flow chart is shown for the steps perfomed in the automated noise level measurement process. These steps include an interaction between the user operating the subsystem through the subsystem's I/O monitor and keyboard and the computer hardware/software interfacing with the various hardware elements shown in FIG. 1 to obtain the data shown in FIG. 2. A user desiring to perform the noise level measurement provides the initial "trigger" via the keyboard and the process then begins as shown by START in the FIG. 3, flow diagram. Under the control of the test system application software, the process runs through the block diagram in FIG.

3 several times, each time with a different wavelength which is determined by the contents of a computer memory file which stores wavelegnth and step width information. Upon completion of the process at END of the final iteration, tests results stored in the computer memory can be provided by normal computer subsystem operation for user display, e.g., via an I/O monitor or printer. Test result data files can be stored or communicated using standard computer/communication system methodology.

The described method and apparatus ensures a much improved accuracy in comparison with the prior art methods based on interpolation. The improvement in accuracy depends on the amount of spontaneous emission of the source, on the polarization mode dispersion of the fiber amplifier, and on the degree of saturation. According to a practical example, improvements on the order of 0.1 to 0.2 dB are possible.

The method and apparatus of the invention can also be used in conjunction with the amplified spontaneous emission (ASE) interpolation/subtraction method, because strong curvature of the wavelength dependence of the ASE is a typical problem caused by the physics of erbium-doped fiber amplifiers. ASE interpolation/subtraction does not need a polarization controller/filter.

Even though the method and apparatus of the invention is particularly suited for noise measurements in optical amplifiers, it is understood that it is not limited to this area, but that it can also be used in other applications wherein noise is to be measured in the presence of a signal.

We claim:

1. A method of measuring the noise level in the presence of a signal at a signal wavelength, comprising the steps of:
    a) detuning the signal to a second wavelength different from the signal wavelength;
    b) determining a difference function corresponding to the difference in noise levels before and after detuning of the signal as a function of wavelength;
    c) measuring the noise level at the signal wavelength; and
    d) adding the value of the difference function at the signal wavelength to the noise level measured in step c.

2. The method as in claim 1 wherein the value of the difference function at the signal wavelength is determined by interpolation.

3. The method as in claim 1 wherein the value of the difference function at the signal wavelength is determined by approximation.

4. The method as in claim 1 wherein the step of determining the difference function includes the steps of:

i) measuring the noise levels of the curve representing the optical intensity variation before detuning at several wavelengths; and
    ii) measuring the noise levels of the curve representing the optical intensity variation after detuning at the same wavelengths as in step i), respectively.

5. The method of measuring as set forth in claim 1 wherein the noise level in the presence of a signal is a noise level in the presence of a signal in an optical amplifier.

6. The method of claim 5 wherein the optical amplifier is an erbium-doped fiber amplifier.

7. An apparatus for measuring a noise level in the presence of a signal at a signal wavelength, comprising:
    a) means for detuning the signal to a second wavelength different from the signal wavelength;
    b) means for determining a difference function corresponding to a difference in noise levels before and after detuning of the signal as a function of wavelength by said means for detuning;
    c) means for measuring the noise level at the signal wavelength; and
    d) means for adding the value of the difference function at the signal wavelength to the noise level measured by said measuring means.

8. The apparatus as in claim 7 further including an interpolator for determining the value of the difference function at the signal wavelength.

9. The apparatus as in claim 7 further including means for determining the value of the difference signal at the signal wavelength by approximation.

10. The apparatus as in claim 7 wherein said means for determining a difference function includes:
    i) means for measuring the noise levels of the curve representing the optical intensity variation before detuning at several wavelengths by said means for detuning; and
    ii) means for measuring the noise levels of the curve representing the optical intensity variation after detuning by said means for detuning at said several wavelengths.

11. The apparatus as in claim 7 wherein the noise level in the presence of a signal is a noise level in the presence of a signal in an optical amplifier.

12. The apparatus as in claim 11 wherein the optical amplifier is an erbium-doped fiber amplifier.

* * * * *